United States Patent
Ozhan et al.

(10) Patent No.: US 8,015,152 B2
(45) Date of Patent: Sep. 6, 2011

(54) WEB BASED CLIENT/SERVER NOTIFICATION ENGINE

(75) Inventors: Ozan Ozhan, Sammamish, WA (US); James R. Van Eaton, Woodinville, WA (US); Russell L. Simpson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 344 days.

(21) Appl. No.: 11/338,039

(22) Filed: Jan. 24, 2006

(65) Prior Publication Data

US 2007/0198677 A1    Aug. 23, 2007

(51) Int. Cl.
*G06F 17/00*    (2006.01)
*G06F 7/00*    (2006.01)
(52) U.S. Cl. ........ 707/613; 707/632; 707/769; 707/966; 709/203
(58) Field of Classification Search ............. 707/10
See application file for complete search history.

(56) References Cited

U.S. PATENT DOCUMENTS

| | | | | |
|---|---|---|---|---|
| 6,101,541 | A * | 8/2000 | Ellesson et al. | 709/225 |
| 6,167,448 | A * | 12/2000 | Hemphill et al. | 709/224 |
| 6,185,613 | B1 * | 2/2001 | Lawson et al. | 709/224 |
| 6,598,068 | B1 * | 7/2003 | Clark | 718/104 |
| 6,725,228 | B1 * | 4/2004 | Clark et al. | 707/102 |
| 6,763,384 | B1 * | 7/2004 | Gupta et al. | 709/224 |
| 6,871,214 | B2 * | 3/2005 | Parsons et al. | 709/206 |
| 6,920,436 | B2 * | 7/2005 | Stefik et al. | 705/51 |
| 6,963,919 | B1 * | 11/2005 | Gary et al. | 709/229 |
| 7,068,189 | B2 * | 6/2006 | Brescia | 340/995.1 |
| 7,076,235 | B2 * | 7/2006 | Esque et al. | 455/404.1 |
| 7,127,485 | B2 * | 10/2006 | Caruso et al. | 709/203 |
| 2004/0002958 | A1 * | 1/2004 | Seshadri et al. | 707/3 |
| 2004/0225718 | A1 * | 11/2004 | Heinzel et al. | 709/206 |
| 2005/0080857 | A1 * | 4/2005 | Kirsch et al. | 709/206 |
| 2005/0091319 | A1 * | 4/2005 | Kirsch | 709/206 |
| 2005/0108332 | A1 * | 5/2005 | Vaschillo et al. | 709/206 |
| 2005/0160335 | A1 * | 7/2005 | Peterson | 714/724 |
| 2005/0198159 | A1 * | 9/2005 | Kirsch | 709/206 |
| 2007/0076646 | A1 * | 4/2007 | Foster | 370/315 |

OTHER PUBLICATIONS

Padwick, Gordon, Special Edition Using Microsoft Outlook 2002, Publisher: Que, May 27, 2001, ISBN-10: 0789725141, 896 pp. I-2, 1-1, 2-13, 5-4, 9-1, 9-16, 11-19, 14-4, 22-6, 27-1, 27-12, 30-2, Figures: 2.7, 10.5, 14-1, 14-4, Table B.4).*
Microstrategy: DSS broadcaster—the industry's first information broadcast server, Publication Date: Mar. 20, 1998, Dow Jones Interactive Publication Library, pp. 1-5.*

* cited by examiner

*Primary Examiner* — Greta L Robinson
*Assistant Examiner* — James J Wilcox
(74) *Attorney, Agent, or Firm* — Merchant & Gould P.C.

(57) ABSTRACT

Various technologies and techniques improve the updating of client content in a client/server arrangement. A client notification engine of a user interface subscribes to receive notifications from a central server side notification engine. The client notification engine polls the server side notification engine at a specified interval. The server side notification engine receives and aggregates notifications about and/or from one or more sources and aggregates them into a collection of relevant notifications. These notifications are sent to the client where the different subscriptions originated and are then used by the user interface in the client to update part of the content being displayed as appropriate.

20 Claims, 13 Drawing Sheets

WEB BASED CLIENT/SERVER NOTIFICATION ENGINE

BACKGROUND

In today's world of technology, it has become easier than ever before to communicate with people using one or more of a variety of communication methods, such as email, telephone, fax, instant messaging, and so on. Communication and personal organizer programs typically have the ability to display messages received from one or more of these various sources. Some communication programs operate in a web browser, such as MICROSOFT® Office OUTLOOK® Web Access (OWA), Yahoo Mail, AOL Mail, and others. With such disconnected applications, the server is not contacted until something is needed, such as when the user performs an action that requires the page to be updated or changed. When new communication messages are received on the server, the client is not updated with the new content until the user selects an option to perform a manual refresh of the page's contents, or until the user otherwise takes some action causing the client to request that the server provide such updated information.

SUMMARY

Various technologies and techniques are disclosed that improve the updating of client content in a client/server arrangement. A client notification engine of a user interface, such as a communication management or email application, subscribes to receive notifications from a server side notification engine. The client polls the server side notification engine at specified intervals. The server side notification engine receives and aggregates notifications about and/or from one or more sources and aggregates them into a collection of relevant notifications at a specified interval. These notifications are sent to the client where the different subscriptions originated and are then used by the user interface in the client to update part of the content being displayed as appropriate. In one implementation, a status bar is updated to indicate that new communications have been received, such as a new email, a new fax, and/or a new voice mail. Alternatively or additionally, a folder list is updated to display updated totals, such as the number of unread messages in each folder or the number of total items in each folder. Alternatively or additionally, the contents of the folder that the user is currently viewing are updated if they changed.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a system that improves the updating of client content in a client/server arrangement. A client notification engine of a user interface subscribes to receive notifications from a server side notification engine. The client notification engine polls the server side notification engine at a specified interval. The server side notification engine receives and aggregates notifications about and/or from one or more sources and/or data stores and aggregates them into a collection of relevant notifications based on the context of the user. These notifications are sent to the client where the different subscriptions originated and are then used by the user interface in the client to update part of the content being displayed as appropriate. A status bar or other area is updated in the user interface to indicate that new communications have been received, such as a new email, a new fax, and/or a new voice mail. Alternatively or additionally, a folder list is updated to display updated totals, such as the number of unread messages in each folder or the number of total items in each folder. Alternatively or additionally, the contents of the folder that the user is currently viewing are updated if they changed.

The term folder as used herein is referring to any collection of messages, however they are stored and/or are represented in a graphical user interface. One of ordinary skill in the art will appreciate that some operating systems do not use the term folder when referring to a collection of messages, and that such scenarios are still covered by the examples illustrated herein that use the term folder.

In one implementation, the system is a web-based communication application such as MICROSOFT® Office OUTLOOK® Web Access (OWA), Yahoo Mail, or AOL Mail. In another implementation, the system is any type of communication application, web-based or not, that is not required to maintain a constant connection to one or more data stores, such as MICROSOFT® Office OUTLOOK® and/or other email clients that support POP3 and/or other disconnected message protocols. In yet another implementation, the system is not a communication application, but serves other purposes, such as project scheduling, travel planning, or others.

Figure 1:
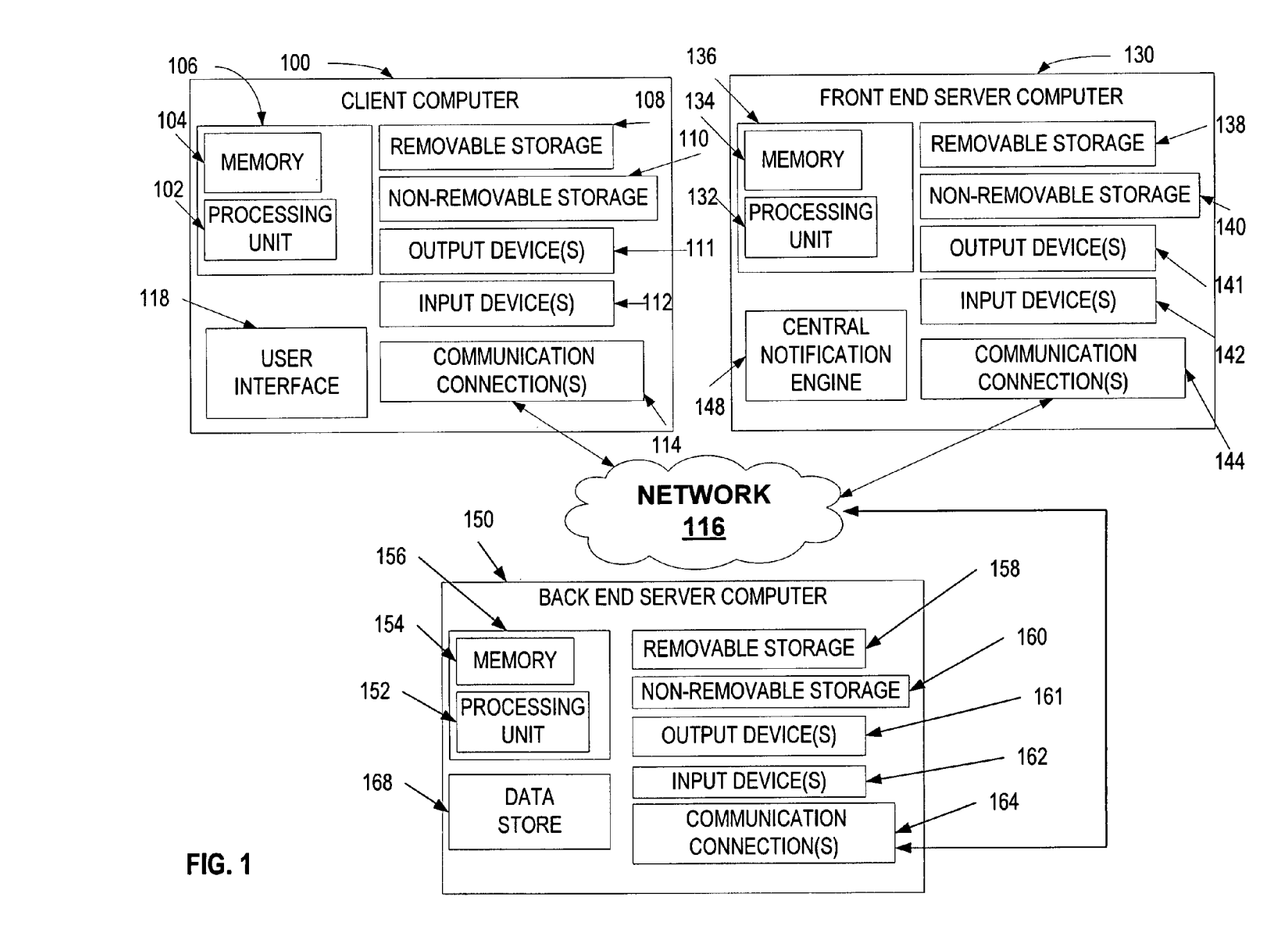
FIG. 1 is a diagrammatic view of parts of a system of one implementation.

As shown in FIG. 1, an exemplary computer system to use for implementing one or more parts of the system includes one or more computing devices, such as computing devices 100, 130, and/or 150. In its most basic configuration, computing devices 100, 130, and/or 150 typically include at least one processing unit (102, 132, and 152, respectively) and memory (104, 134, and 154, respectively). Depending on the exact configuration and type of computing device, memory (104, 134, or 154) may be volatile (such as RAM), non-volatile (such as ROM, flash memory, etc.) or some combination of the two. This most basic configuration is illustrated in FIG. 1 by lines 106, 136, and 156.

Additionally, devices 100, 130, and/or 150 may also have additional features/functionality. For example, devices 100, 130, and/or 150 may also include additional storage (removable and/or non-removable) including, but not limited to, magnetic or optical disks or tape. Such additional storage is illustrated in FIG. 1 by removable storage (108, 138, and 158, respectively) and non-removable storage (110, 140, and 160, respectively). Computer storage media includes volatile and nonvolatile, removable and non-removable media implemented in any method or technology for storage of information such as computer readable instructions, data structures, program modules or other data. Memory (104, 134, and 154), removable storage (108, 138, and 158), and non-removable storage (110, 140, and 160) are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100, 130, and/or 150. Any such computer storage media may be part of device 100, 130, and/or 150.

Computing devices 100, 130, and/or 150 include one or more communication connections that allow computing devices 100, 130, and/or 150 to communicate with each other and/or one or more other computing devices over network 116. Communications connection(s) 114, 144, and 164 are examples of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one implementation, computing device 100 is a client computer that communicates with front end server computer 130 using communication connection 114 and 144 over network 116. In such an implementation, user interface 118 of client computing device 100 communicates with notification engine 148 on server computing device 130 to subscribe to notifications and receive updated information. Front end server computer 130 communicates with back end server computing device 150 by network 116 using communication connections 144 and 164.

In one implementation, user interface 118 of client computing device 100 is a browser-based user interface, such as MICROSOFT® Office OUTLOOK® Web Access (OWA), server computing device 130 is a web server, and back end server computing device 150 hosts a data store for a communication program, such as MICROSOFT® Exchange. In another implementation, user interface 118 of client computing device 100 is a user interface included in an executable program located on client computing device 100, such as MICROSOFT® Office OUTLOOK®, MICROSOFT® Project, or Lotus Notes. It will be appreciated that front end server computer 130 and back end server computing device 150 can be the same computer in alternate embodiments. Furthermore, it will be appreciated that additional back end server computing device 150 could also be used, such as where multiple data stores are accessed by front end server computing device 130.

Computing devices 100, 130, and 150 may also have input device(s) (112, 142, and 162, respectively) such as keyboard, mouse, pen, voice input device, touch input device, etc. Output device(s) (111, 141, and 161, respectively) such as a display, speakers, printer, etc. may also be included. These devices are well known in the art and need not be discussed at length here.

Figure 2:
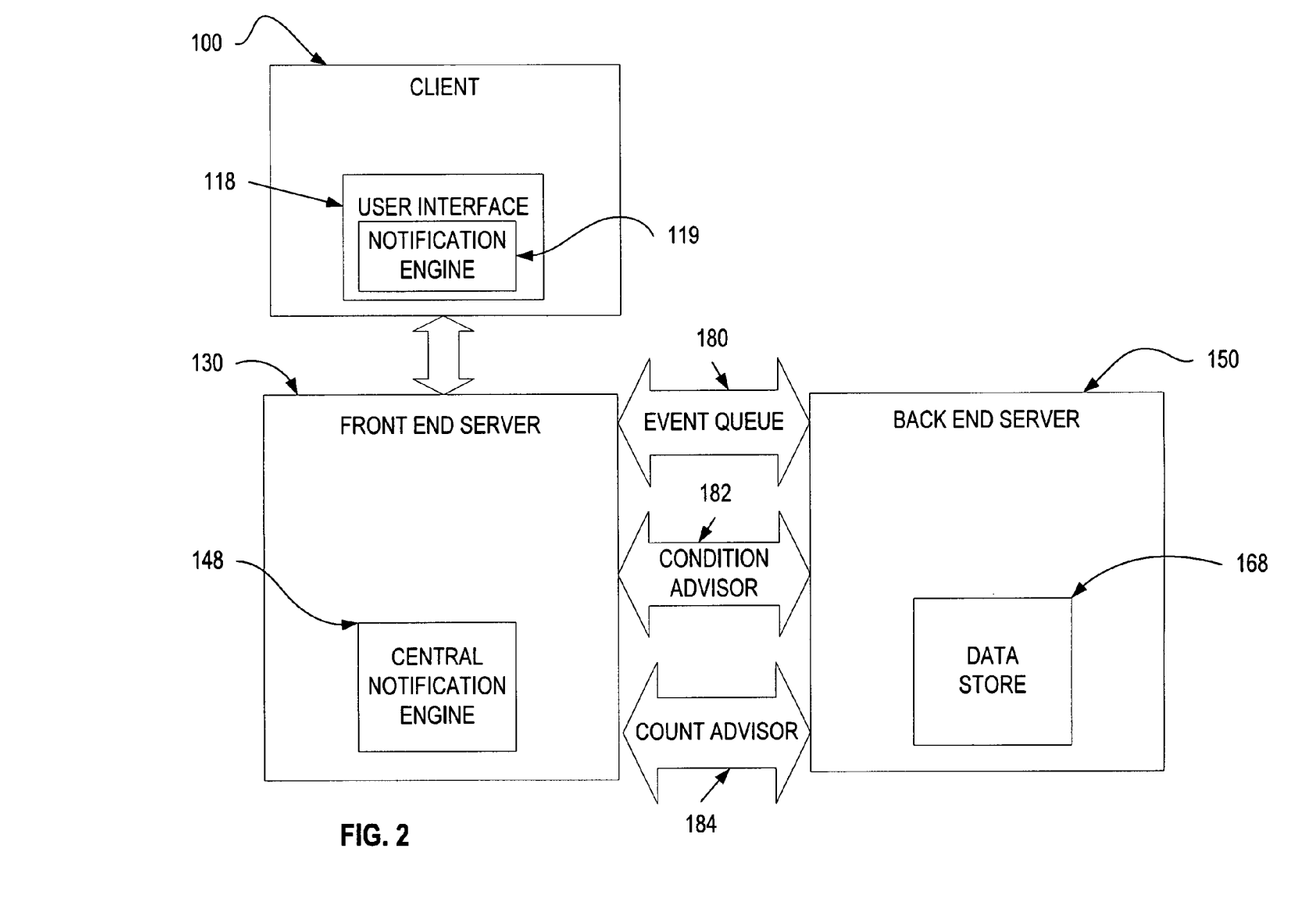
FIG. 2 is a diagrammatic view of additional parts of the system of FIG. 1 of one implementation.

Turning now to FIG. 2 with continued reference to FIG. 1, a diagrammatic view of additional parts of system of FIG. 1 of one implementation are illustrated. The same reference numerals are used on FIG. 2 for those items that are the same as on FIG. 1. Notification engine 119 of user interface 118 on client computing device 100 communicates with central notification engine 148 of front end server computing device 130 to subscribe to notifications. In one implementation, central notification engine 148 has a notification manager class that contains methods for creating one or more event queues, deleting an event queue, flushing and/or disposing of an event queue, creating a condition advisor, deleting a condition advisor, flushing and/or disposing of a condition advisor, creating a folder count advisor, deleting a folder count advisor, flushing and/or disposing of a folder count advisor, and/or other methods for performing other operations.

Central notification engine 148 has an event queue object 180, a condition advisor object 182, and a count advisor object 184 that are operable to communicate with one or more data stores 168 on one or more back end server computing devices 150 to obtain updated information at specified data gathering intervals. A few non-limiting examples of such data stores include one or more message stores or products such as MICROSOFT® Exchange, a POP3 or IMAP email data store, a fax data store, and/or another file or database. The updated information is then aggregated by central notification engine 148 and returned to notification engine 119 on client computing device 100 for further processing by user interface 118. In one implementation, only relevant information is returned, such as those specific to the context in which the user is working. As one non-limiting example, if the user is currently viewing his or her calendar, then detailed information about the calendar would be returned, but detailed information about the contents of the inbox would not be returned. In other implementations, more information is returned.

Figure 3:
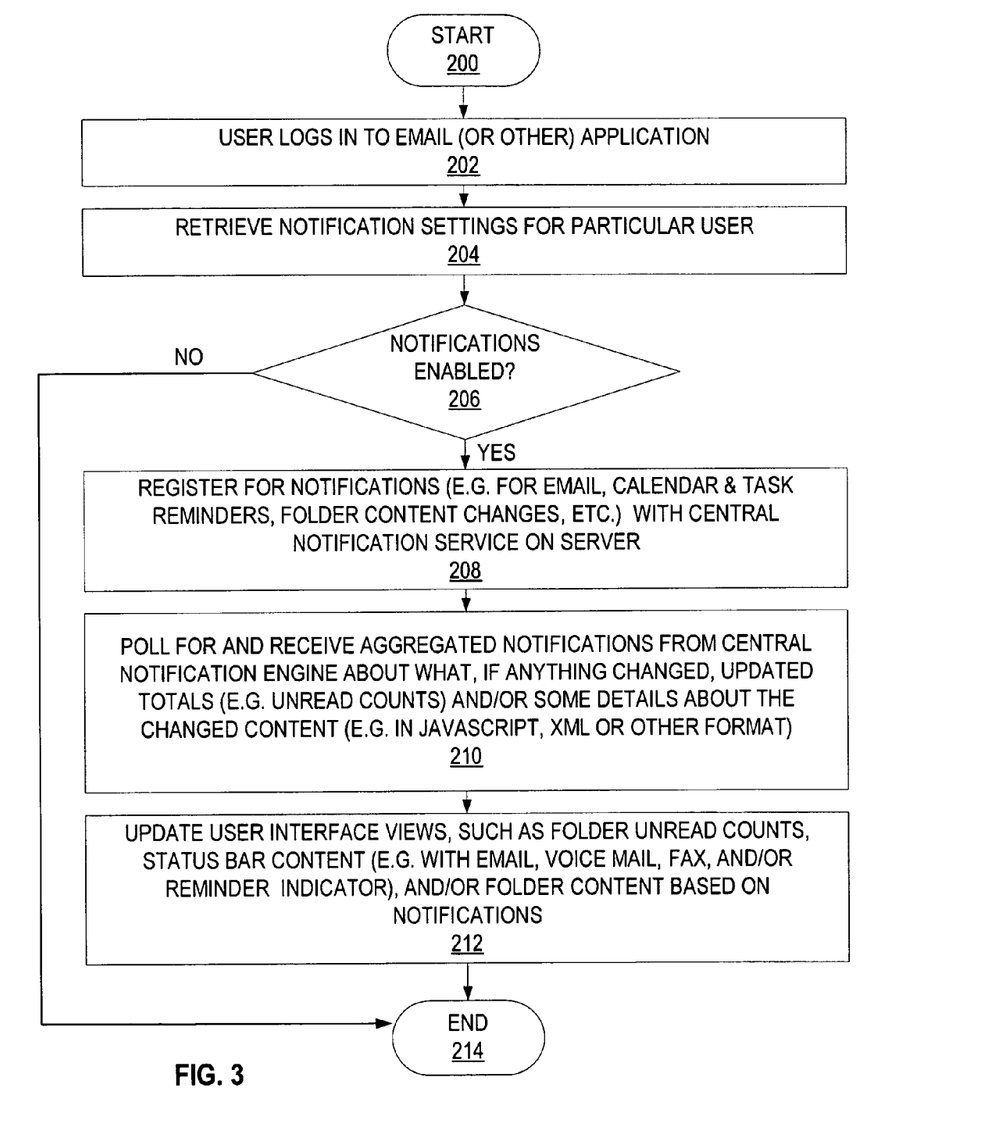
FIG. 3 is a high level process flow diagram for one implementation of the system of FIG. 1.

Turning now to FIG. 3 with continued reference to FIGS. 1 and 2, a high level process flow for one implementation is presented. In one form, the process of FIG. 3 is at least partially implemented in the operating logic of computing device 100, 130, and/or 150. The process begins at start point 200 with the user logging into an email or other application (stage 202). Client computing device 100 retrieves notification settings for the particular user (stage 204). If notifications are not enabled for the particular user (decision point 206), then the process ends at end point 214. If notifications are enabled for the particular user (decision point 206), then notification engine 119 of client computing device 100 communicates with central notification engine 148 on front end server computing device 130 to register for notifications (stage 208).

A few non-limiting examples of notifications include email messages, calendar reminders, task reminders, folder content changes, folder count totals, etc. Notification engine 119 polls for and receives notifications that were aggregated by central notification service about what, if anything changed, updated totals (such as unread item counts), and/or some details about the changed and/or new content (stage 210).

In one implementation, the details about the changes and status of the various data that are received by the client are included in one or more text files, such as XML. In another implementation, the details are received in a scripting language format, such as JavaScript or VBScript, where the script is executed and/or consumed by the notification engine on the client. In yet another implementation, the details are received in another file type or format for interpretation, execution, and/or display on the client. User interface 118 interprets the information received from the central notification engine and updates the user interface display appropriately (stage 212). In one implementation, folder unread counts are updated to indicate the number of unread messages contained in that folder. Alternatively or additionally, a status or indicator bar in the user interface is updated to display whether there are new reminders and/or new messages, such as new email, fax, voice messages, and/or reminders. Alternatively or additionally, a custom-defined rule can be defined by the user for display in the status bar, such as to notify the user of any messages received from the boss. Alternatively or additionally, a folder the user is currently viewing is updated with any new content relevant to the particular display. Alternatively or additionally, other content can also be stored locally for quick retrieval once the user changes context where the information would be needed. The process then ends at end point 214.

Figure 4:
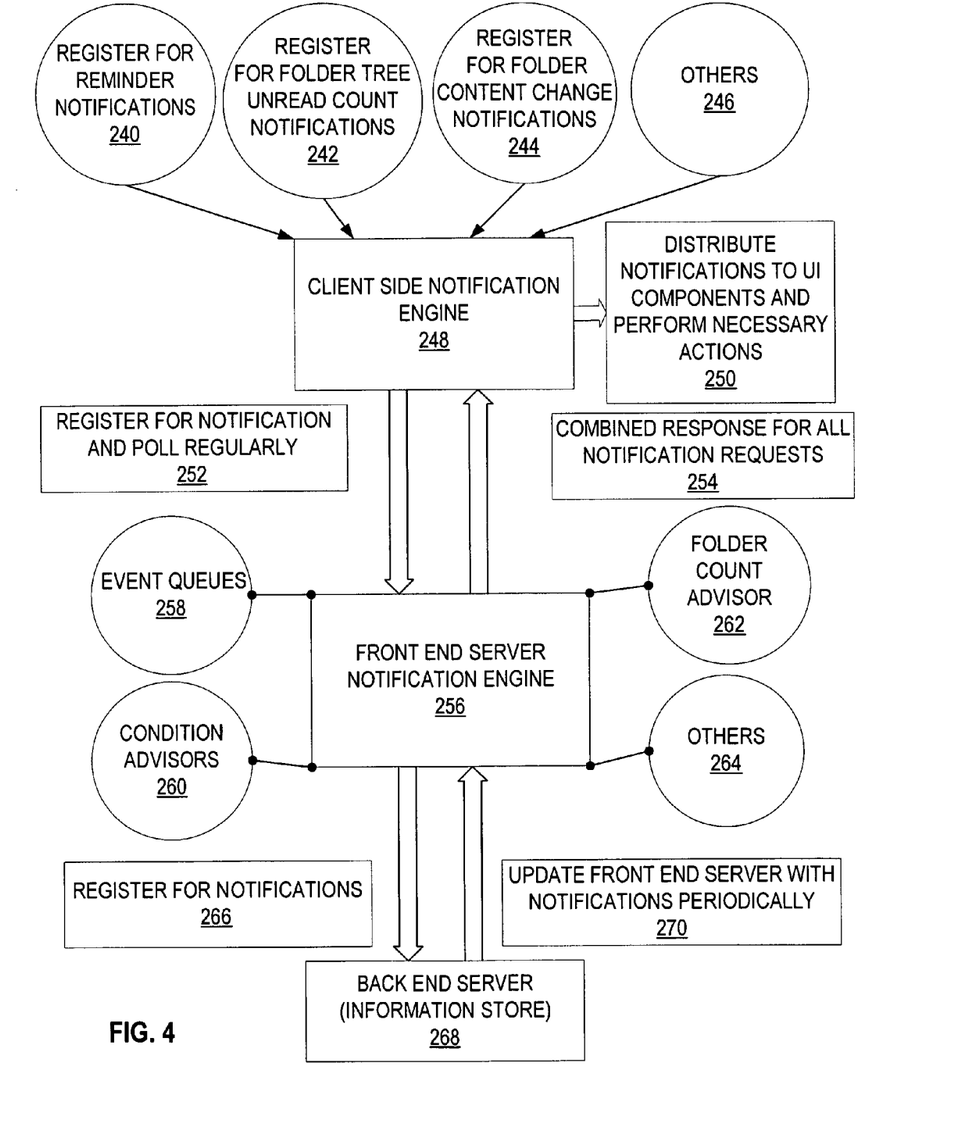
FIG. 4 is a logical diagram for one implementation of the system of FIG.1 illustrating the communications between the client side notification engine and the front end server notification engine for subscribing to and managing notifications.

Turning now to FIG. 4 with continued reference to FIGS. 1 and 2, a logical diagram describing the process for subscribing to and managing notifications in one implementation are illustrated. In one form, the process of FIG. 4 is at least partially implemented in the operating logic of computing device 100, 130, and/or 150. Client computing device 100 registers for one or more notifications, such as reminder notifications (stage 240), folder tree unread count notifications (stage 242), folder content change notifications (stage 244), and/or other notifications (stage 246) with client side notification engine 248 (119 on FIG. 2). Client side notification engine 248 registers for notifications with front end server notification engine 256 (148 on FIG. 2) and polls regularly (stage 252). Front end server notification engine 256 manages event queues 258, condition advisors 260, folder count advisor 262, and/or other information tracking objects 264.

Front end server notification engine 256 registers for notifications (stage 266) with one or more data stores 168 on back end server computing device(s) 268 (150 on FIG. 2). Back end server computing device 268 updates front end server notification engine 256 with notifications periodically (stage 270). In other words, the event queue(s), content advisors, and item count advisors are updated accordingly. In one implementation, front end server notification engine 256 combines the responses for all notification requests (stage 254) and returns only the necessary ones (such as the relevant ones) to the client side notification engine 248. The client side notification engine 248 distributes notifications to user interface components and performs the necessary actions (stage 250), such as to update the display.

Figure 5:
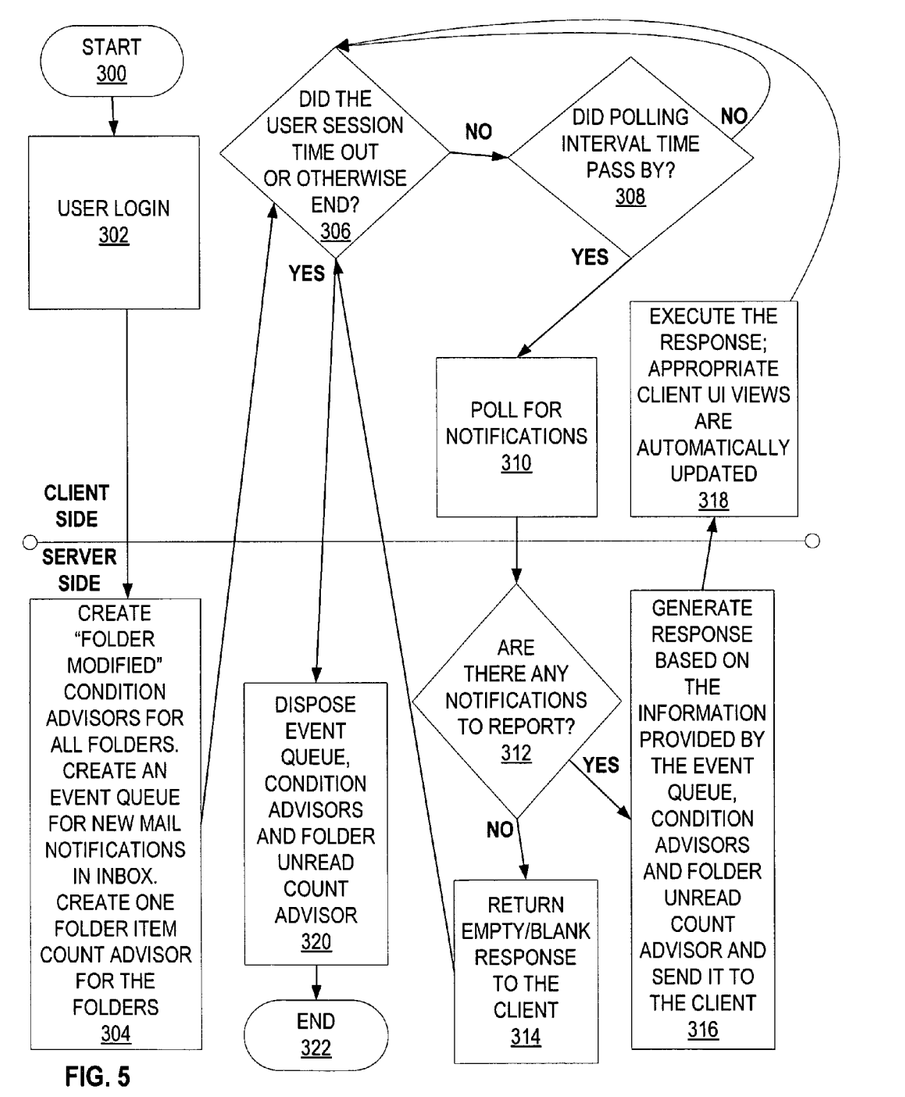
FIG. 5 is a process flow diagram for one implementation of the system of FIG.1 illustrating the stages involved in registering for notifications, collecting notification responses, and processing the response received.

Turning now to FIG. 5 with continued reference to FIGS. 1 and 2, the stages involved in registering for notifications, collecting notification responses, and processing the response received in one implementation are illustrated. In one form, the process of FIG. 5 is at least partially implemented in the operating logic of computing device 100, 130, and/or 150. The process begins at start point 300 with the user logging in to the application (stage 302). Client side notification engine 248 of user interface 118 registers for notifications with the central notification engine 148. In one implementation, central notification engine 148 creates folder modified condition advisors for all folders, event queues for new notifications, such as in the Inbox, and/or folder item count advisors for some or all of the folders (stage 304). If the session has not timed out or otherwise ended (decision point 306), then the client notification engine 119 checks to determine whether the polling interval time has passed (decision 308). The client notification engine 119 waits until the polling interval passes by (decision point 308) to poll the central notification engine 148 for notifications (stage 310). If there are notifications to report (decision point 312), then the central notification engine 148 generates a response based on the information in the event queue(s), condition advisors, and folder unread count advisor(s) and sends them to the client side notification engine 248 for further processing by the user interface 118 (stage 316). User interface 118 interprets and/or otherwise executes the response, and updates the appropriate user interface views (stage 318).

If there are no notifications to report (decision point 312), then the central notification engine 148 generates an empty or blank response and sends it to the client side notification engine 248 (stage 314). The process then repeats for each polling interval (decision point 308) or until the user session times out or the user closes the application (decision point 306). If the session times out or the user otherwise ends the session or application (decision point 306), such as by closing the browser or program, then the event queue, condition advisors, and folder unread count advisor objects are destroyed (stage 320) to free up system resources. The process then ends at end point 322.

Figure 6:
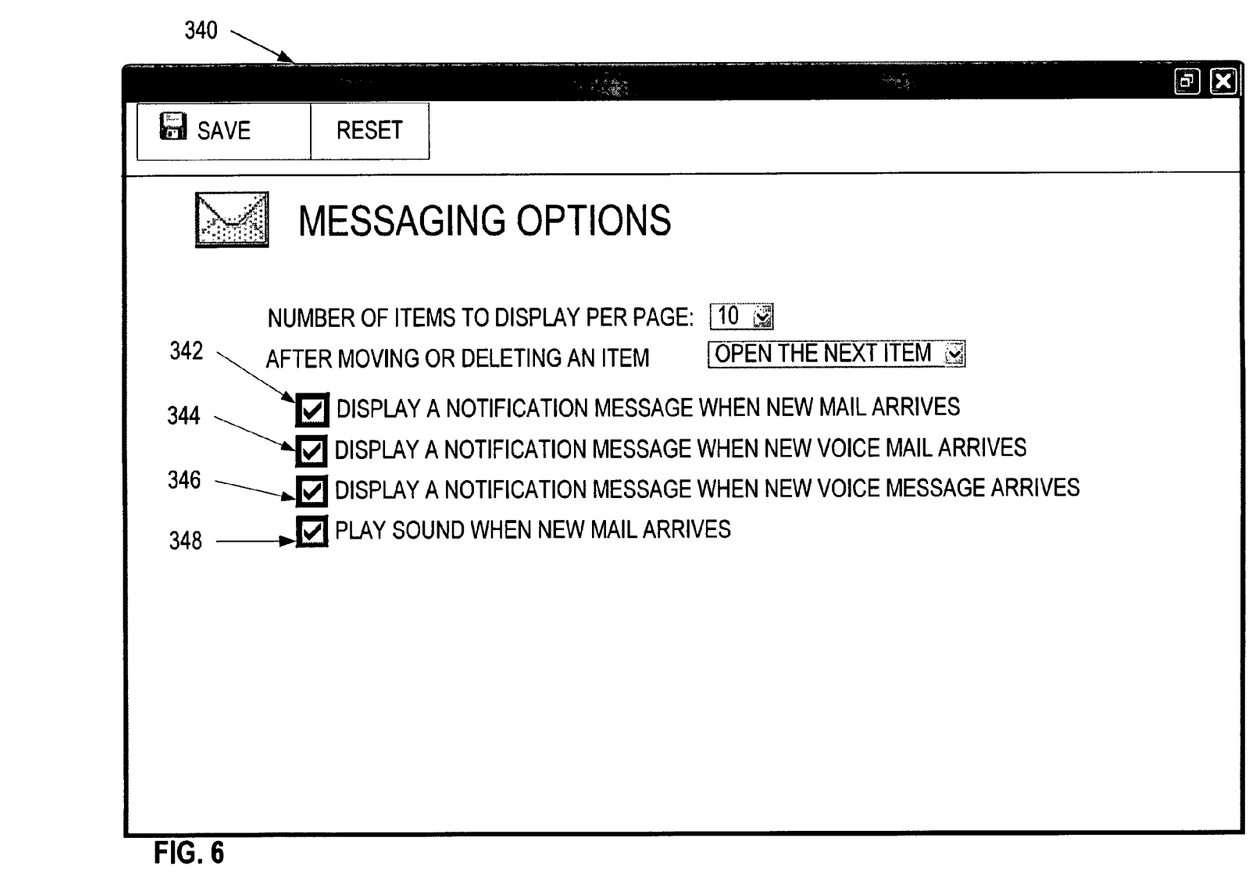
FIG. 6 is a simulated screen for one implementation of the system for FIG. 1 which illustrates allowing a user to specify messaging notification options.

FIG. 6 is a simulated screen 340 for one implementation of the system for FIG. 1 which illustrates allowing a user to specify messaging notification options. The user can select whether to enable or disable options that display a notification message when new mail arrives 342, display a notification message when a new voice mail arrives 344, display a notification when new voice message arrives 346, and/or to play a sound when new message arrives 348. In one implementation, if any one or more of these options are enabled (decision point 206 on FIG. 3), then user interface 118 of client computing device 100 registers for messaging event notifications with central notification engine 148 on front end server computing device 130.

Figure 7:
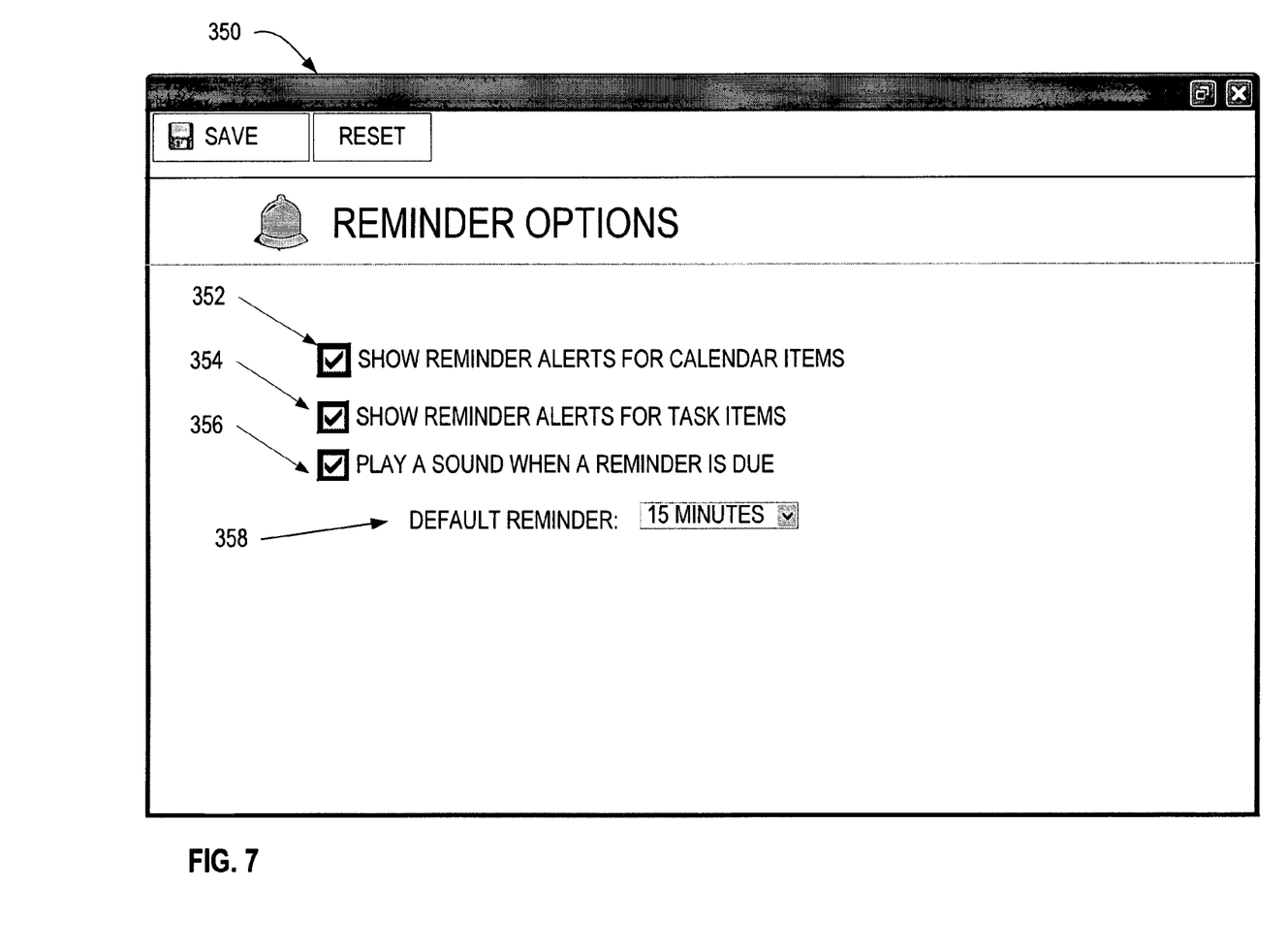
FIG. 7 is a simulated screen for one implementation of the system for FIG. 1 which illustrates allowing a user to specify reminder notification options.

FIG. 7 is a simulated screen 350 for one implementation of the system for FIG. 1 which illustrates allowing a user to specify reminder notification options. The user can select whether to enable or disable options that show reminder alerts for calendar items 352, show reminder alerts for task items 354, plays a sound when a reminder is due 356, and/or to set the default reminder time frame 358. In one implementation, if any one or more of options 352, 354, or 356 are enabled (decision point 206 on FIG. 3), then user interface 118 of client computing device 100 registers for reminder event notifications with central notification engine 148 on front end server computing device 130.

After messaging and/or reminder notifications are registered with central notification engine 148, user interface 118 then waits for the polling time to pass by (decision point 308), polls for and receives aggregated notifications from the central notification engine 148 (stage 310) and processes the response to update the user interface accordingly (stage 318).

Figure 8:
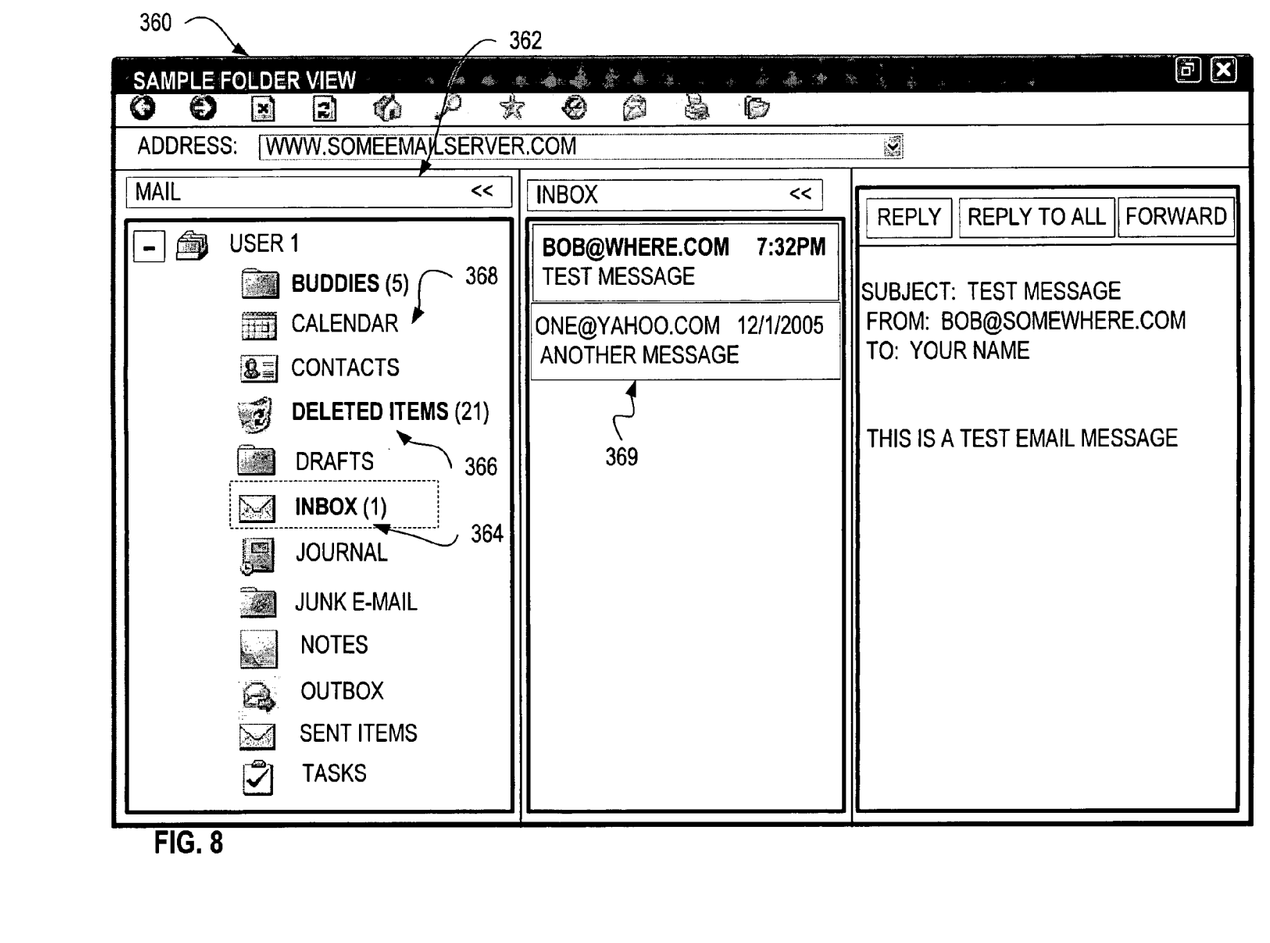
FIG. 8 is a simulated screen for one implementation of the system for FIG. 1 which illustrates an email application with unread totals that were updated based on the subscription process of FIGS. 4 and 5.

Non-limiting examples of how the user interface 118 can be updated based on the aggregated notifications are shown in simulated screens 8-13. FIG. 8 is a simulated screen 360 for one implementation of the system for FIG. 1 which illustrates an email application with unread totals that were updated based on the event subscription process of FIGS. 3-5. Simulated screen 360 is a browser-based communication/personal organizer application that has various folders, such as Inbox 364, one or more user defined folder(s), Deleted Items 366, Calendar 368, and/or other folders, for displaying information to the user and allowing the user to manage his or her information and/or schedule. Upon receiving aggregated notifications from central notification engine (stage 210), folder counts are updated, such as "(7)" for Inbox 364, and/or others shown on screen 360. In one implementation, the totals represent the total number of unread items in the folder. In another implementation, the total represents the total number of items in the folder. Alternatively or additionally, the user interface can be updated automatically to display new content that is relevant to the context that the user is working in. For example, since the user has the Inbox folder 364 selected, new messages can be displayed in message area 369 based upon a sort order setting specified by the user or by a system default setting.

Figure 9:
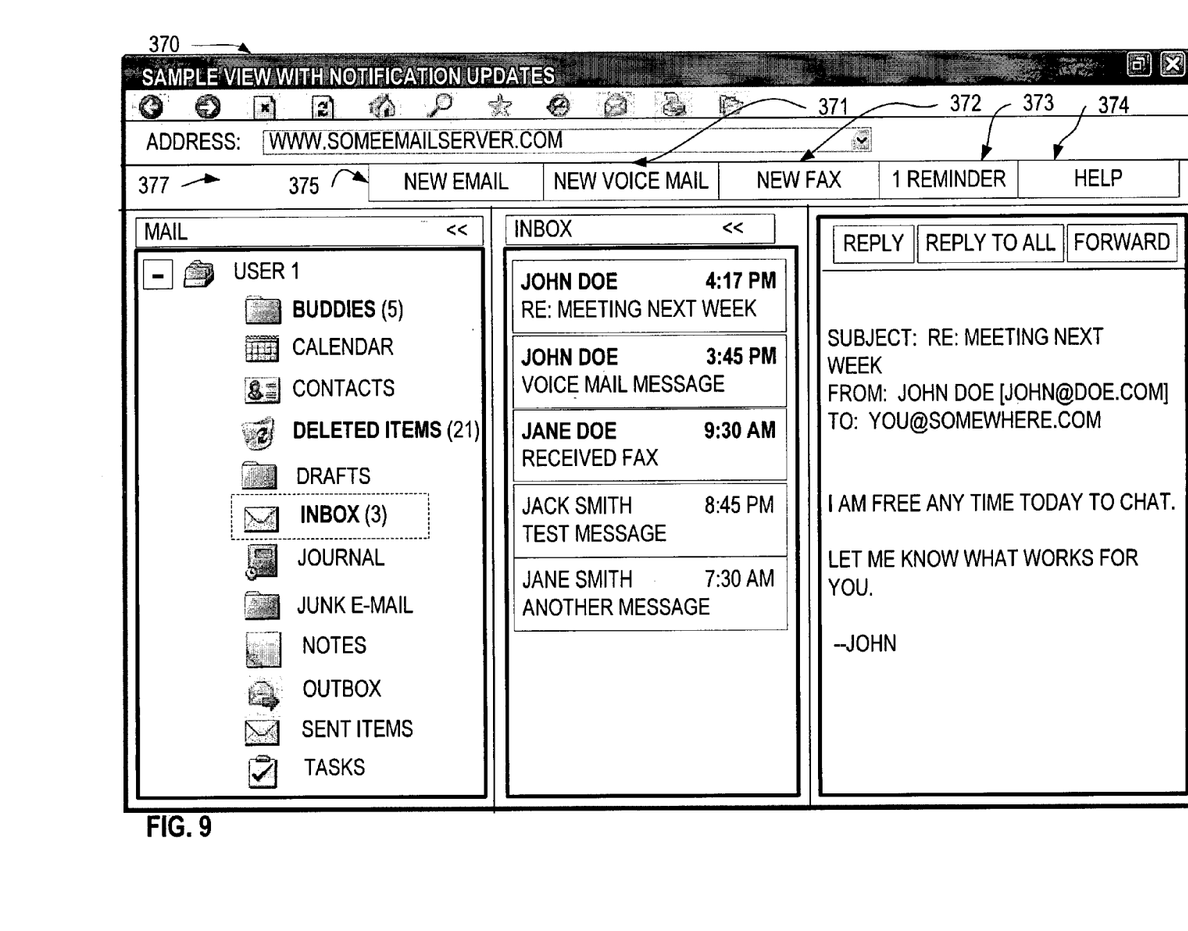
FIG. 9 is a simulated screen for one implementation of the system for FIG. 1 which illustrates an email application with a status bar that was updated based on the subscription process of FIGS. 4 and 5.

As shown in FIG. 9, in one implementation, a status bar is updated based on the aggregated notifications received from central notification engine (stage 210). For example, status bar 377 on simulated screen 370 includes four notification messages: New Email 375, New Voice Mail 371, New Fax 372, and New Reminder 373 that represent the type of new messages and/or reminders (e.g. calendar and/or task reminders) that have been received by the user. Other variations are also possible that include some or additional message and/or reminder notifications than these. In one implementation, a Help option 374 is displayed in the status bar.

Figure 10:
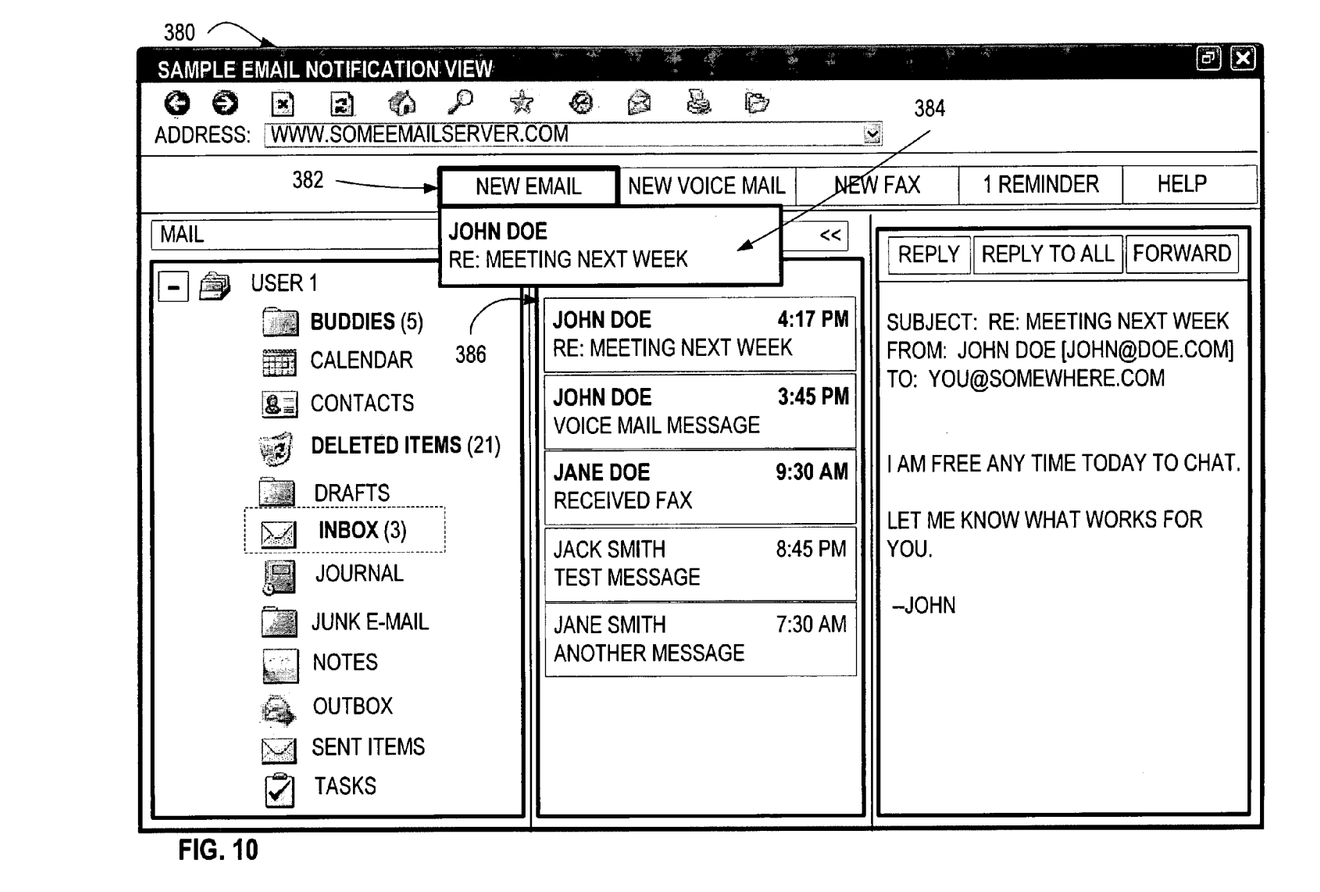
FIG. 10 is a simulated screen for one implementation of the system for FIG. 1 which illustrates the new email message that was received when the user selects the New Mail option on the status bar of the simulated screen of FIG. 9.

Turning now to FIG. 10, in one implementation, when the user selects the New Email notification message 382 (or a particular notification) in the status bar of screen 380, a snippet of the message 384 is shown near the status bar area to give the user a preview of the message. In one implementation, the New Email notification message 382 (or selected notification) then disappears after the user selects it from the status bar area. In another implementation, the New Email notification message 382 (or selected notification) is displayed until the user accesses the message in the Inbox folder and causes the status of the message to change to "read".

Instead of or in addition to showing a snippet of the message 384 when the user selects New Email notification message 382, the snippet 384 can be displayed for a specified period of time (such as 5 seconds) when the screen is first updated. In another implementation, when the user selects New Email notification message 382, contents 386 of inbox folder are updated to include the new message(s). In yet another implementation, contents 386 of inbox folder are updated automatically when the aggregated notifications are received from the central notification engine 148. Other variations are also possible that include combinations of these, fewer, and/or additional variations.

Figure 11:
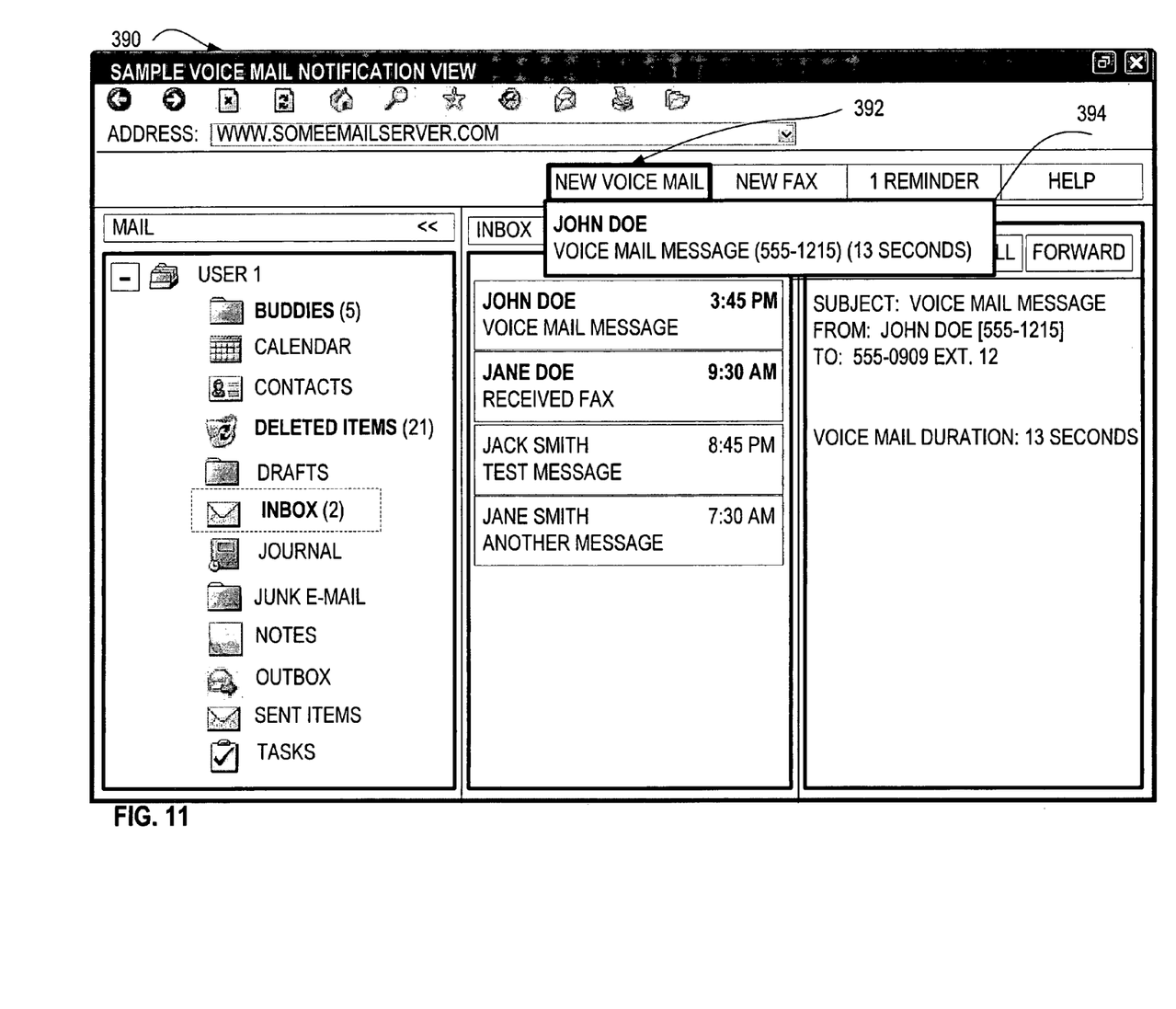
FIG. 11 is a simulated screen for one implementation of the system for FIG. 1 which illustrates the new voice mail message that was received when the user selects the New Voice Mail option on the status bar of the simulated screen of FIG. 9.
Figure 12:
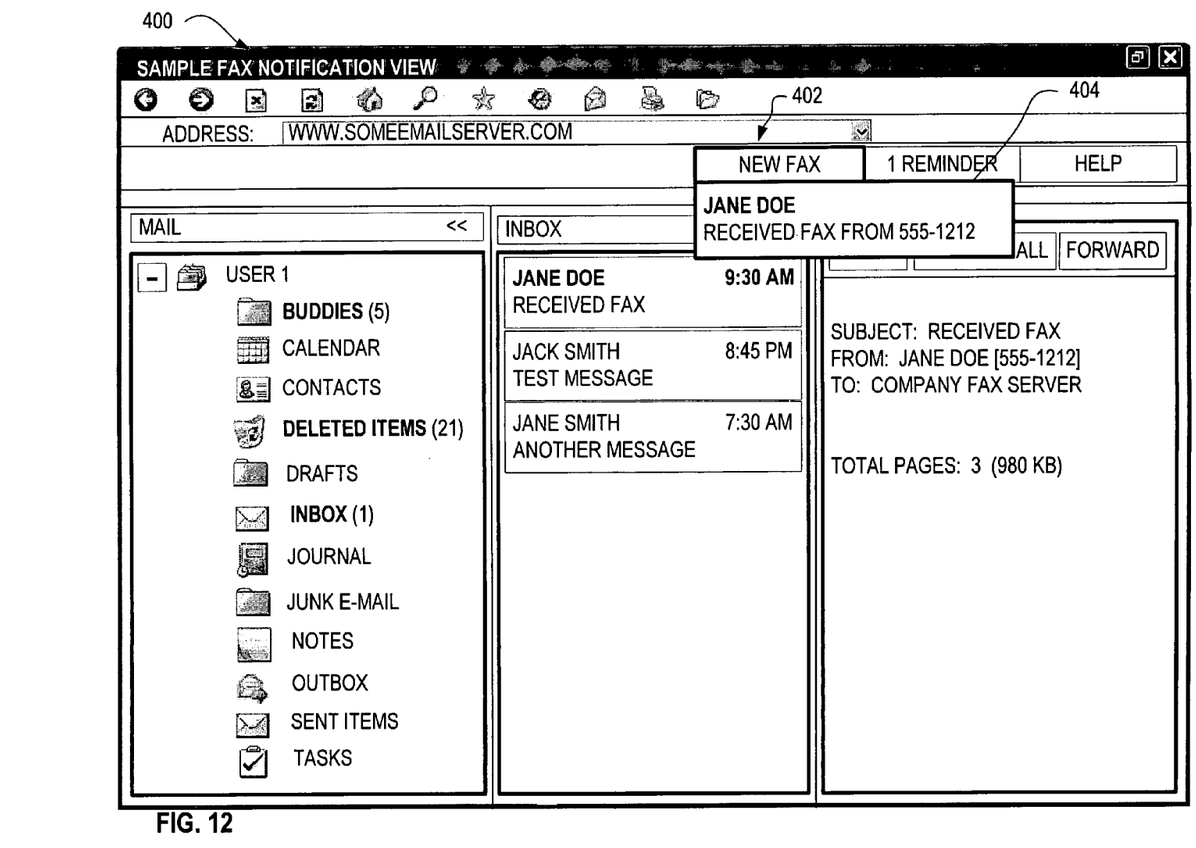
FIG. 12 is a simulated screen for one implementation of the system for FIG. 1 which illustrates the new fax message that was received when the user selects the New Fax option on the status bar of the simulated screen of FIG. 9.
Figure 13:
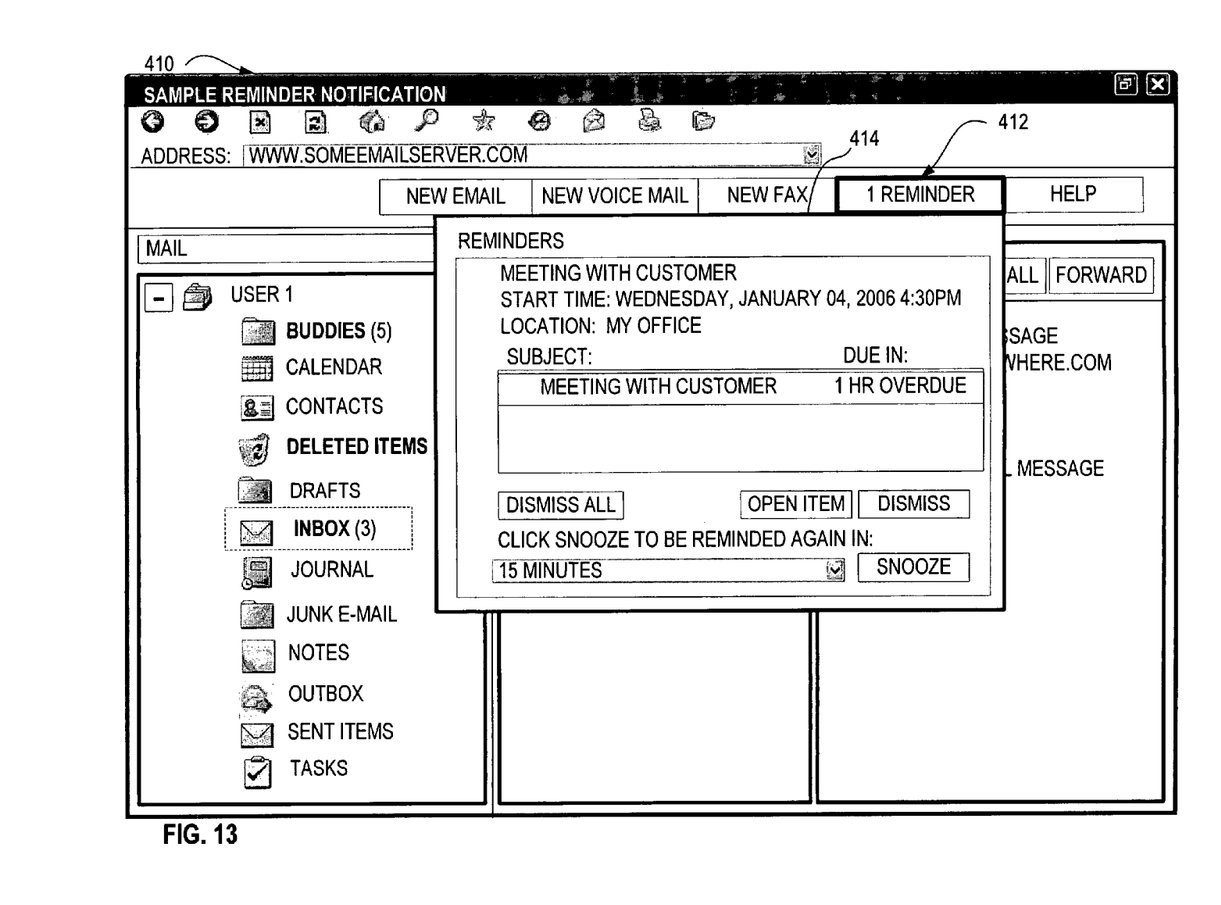
FIG. 13 is a simulated screen for one implementation of the system for FIG. 1 which illustrates the new calendar reminder that was received when the user selects the Reminders option on the status bar of the simulated screen of FIG. 9.

Similarly to FIG. 10, FIGS. 11-13 are simulated screens (390, 400, and 410, respectively) for one implementation of the system for FIG. 1 which illustrate what happens in the status bar area when the user selects the other options. For example, simulated screen 390 of FIG. 11 illustrates what happens in the status bar area when the user selects the New Voice Mail notification message 392. A snippet of the voice mail message 394 appears near the status bar and includes details such as the caller's phone number and the length of the message. Simulated screen 400 of FIG. 12 illustrates an example of what happens in the status bar area when the user selects the New Fax notification message 402. A snippet of the message 404 appears near the status bar and includes details such as the sender's fax number and/or the number of pages received. Alternatively or additionally, simulated screen 410 of FIG. 13 illustrates an example of what happens in the status bar area when the user selects the New Reminders notification message 412. A snippet of the reminder message 414 appears near the status bar and additional details about the appointment and/or task. In one implementation, calendar and task reminders are grouped together in the same reminder area. In another implementation, calendar reminders have a separate notification message on the status bar from task reminders.

With respect to simulated screens 9-13, numerous other variations are also possible for determining when and where to display the respective snippet, if at all. In some implementations, part or all of the details related to the message and/or reminder are displayed and/or audibly rendered to the user in some fashion.

The examples in FIGS. 7-13 are for purposes of illustration only, and are not limiting in nature. For example, other variations are also possible, such as using the technologies and techniques discussed herein for receiving updated content from a server in applications other than communications programs, such as from a project planning application, such as MICROSOFT® Project. Other examples can include any type of application that does not maintain a constant connection with the server while a user is accessing the application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for improving client-side content updates comprising:
   sending a registration from a client-side notification engine of a communications application to a web server with a central notification engine to register for update notifications;
   at a particular time interval, sending a polling request from the client-side notification engine to the central notification engine for polling whether the central notification engine has one or more update notifications identified with the registration from the client-side notification engine;
   when the central notification engine has one or more notifications to report, receiving a notification response from the central notification engine wherein the notification response is an aggregation of updates from a first data store and a second data store, the updates comprising two or more of the following: email, calendar, contacts, notes, or tasks;
   when the central notification engine has no notifications to report, receiving a notification response from the central notification engine indicating that no updates have occurred.

2. The method of claim 1, wherein the notification response further includes a list of updated folders, the list identifying folders that have updated contents.

3. A computer-readable storage medium having computer-executable instructions for causing a computer to perform the steps recited in claim 1.

4. A computer-readable storage medium having computer-executable instructions for causing a computer to perform acts comprising:
   at a web server computer, receiving a request from a client application to register for a plurality of notifications;
   creating, at a back-end server computer, a condition advisor for at least a first folder in a particular set of folders, the condition advisor being operable to track a modified status for the first folder;
   creating, at the back-end server computer, an item count advisor for at least a second folder in the particular set of folders, the item count advisor being operable to track a count associated with one or more items in the second folder;
   creating, at the back-end server computer, an event queue for new notifications for at least a third folder in the particular set of folders, the event queue being operable to store at least a portion of information about new notifications that are received;
   the back-end server communicating with the at least one data store at specified data gathering time intervals to update the condition advisor, item count advisor, and event queue as a set of data in the data store changes;
   the web server receiving a polling request from the client application after a specified polling interval passes for polling whether there are one or more change notifications to report when at least a portion of content in the at least one data store has changed for the notifications;
   checking at least the condition advisor and item count advisor to determine whether there are one or more notifications to report to the client application;
   generating a notification response that includes at least a portion of the information in the condition advisor, item count advisor, and event queue wherein the notification response contains a reduced amount of information determined by a current context of a user; and
   transmitting the notification response to the client application.

5. The computer-readable medium of claim 4, wherein the checking further comprises checking the event queue as part of determining whether there are one or more notifications to report.

6. The computer-readable medium of claim 4, wherein the item count advisor for the second folder is operable to track a number of unread items in the second folder.

7. The computer-readable medium of claim 4, wherein item count advisor for the second folder is based upon a total number of items in the second folder.

8. The computer-readable medium of claim 4, wherein the condition advisor for the first folder is based upon whether the first folder has a portion of content that has been changed.

9. The computer-readable medium of claim 4, wherein the new notifications are selected from the group consisting of an email message, a fax message, a voice mail message, and a reminder message.

10. The computer-readable medium of claim 4, wherein the first folder and the second folder are a same folder.

11. The computer-readable medium of claim 4, wherein the client application is a browser based application.

12. A system for facilitating content updates in an application comprising:
   a server having a processor and a memory communicatively coupled to the processor and storing executable instructions, the server being a web server operable to communicate with a client over a network via a markup language based protocol;
   the server being further operable to communicate with at least one data store over a network; and
   wherein the server provides a central notification engine service implemented by the processor executing instructions stored on the memory, the central notification engine service being operable to perform a set of operations through the processor and comprising:
      receiving a request from a client application located on the client to register for a plurality of notifications;
      creating at the server an advisor for each of a plurality of folders, the advisor being operable to track whether a particular set of data in the data store has changed;
      communicating with at least one data store at specified data gathering time intervals to update the advisor for each of the folders as a set of data in the data store changes;
      receiving a polling request from the client application after a specified polling interval passes for polling whether there are one or more notifications to report when at least a portion of the particular set of data in the data store has changed for the notifications;
      checking the advisor for each of the folders to determine whether there are two or more notifications to report to the client application;
      if there are two or more notifications to report, combining the two or more notifications at the server, and reporting the combined notification to the client application in a single response.

13. The system of claim 12, wherein the server is further operable to create an item count advisor for each of the folders and a condition advisor for each of the folders.

14. The method of claim 1, wherein the notification response further includes at least one voice mail notification.

15. The method of claim 1, wherein the notification response is represented in XML.

16. The method of claim 1, wherein the request to register for a plurality of update notifications further comprises information identifying a plurality of folders to monitor for changes.

17. The method of claim 1, wherein the central notification engine detects updates in a data store on a separate computer in order to generate update notifications.

18. The method of claim 1, wherein the notification response further includes a list of folders that contain updated information.

19. The method of claim 1, wherein the client-side notification engine is executed inside a web browser.

20. The method of claim 12, wherein the combining the two or more notifications at the server combines at least one email notification and at least one contacts notification.

* * * * *